United States Patent [19]

Berger et al.

[11] 4,275,188

[45] Jun. 23, 1981

[54] STRESS-CRACK RESISTANT POLYARYLATES

[75] Inventors: Mitchell H. Berger, Somerville; Markus Matzner, Edison; Hugh C. Gardner, Somerville, all of N.J.

[73] Assignee: Union Carbide Corporation, New York, N.Y.

[21] Appl. No.: 142,708

[22] Filed: Apr. 22, 1980

Related U.S. Application Data

[63] Continuation-in-part of Ser. No. 15,939, Feb. 28, 1979, abandoned.

[30] Foreign Application Priority Data

Feb. 15, 1980 [CA] Canada ................... 345804
Feb. 27, 1980 [EP] European Pat. Off. ........ 80400275.6
Feb. 27, 1980 [JP] Japan ................. 55-022889

[51] Int. Cl.$^3$ ........................................... C08G 63/18
[52] U.S. Cl. .................................... 528/193; 528/194
[58] Field of Search ................................ 528/193, 194

[56] References Cited

U.S. PATENT DOCUMENTS

| 3,028,364 | 4/1962 | Conix et al. | 528/193 |
| 3,036,991 | 5/1962 | Kantor et al. | 528/193 |
| 3,133,898 | 5/1964 | Keck | 528/193 |
| 3,684,766 | 8/1972 | Jackson, Jr. et al. | 528/194 |
| 3,733,306 | 6/1973 | Wolfes et al. | 528/193 |
| 3,884,990 | 5/1975 | Sakata et al. | 528/193 |
| 4,064,108 | 12/1977 | Inata et al. | 528/193 |
| 4,102,864 | 7/1978 | Deex et al. | 528/193 |

*Primary Examiner*—Lester L. Lee
*Attorney, Agent, or Firm*—Donald M. Papuga

[57] ABSTRACT

Polyarylates derived from a mixture of iso- and terephthalic acids and 4,4'-biphenol and bisphenol A were found to afford melt stable polyesters having good solvent and stress crack resistance.

10 Claims, No Drawings

STRESS-CRACK RESISTANT POLYARYLATES

This application is a continuation-in-part application of Ser. No. 015,939 filed Feb. 28, 1979, now abandoned.

BACKGROUND OF THE INVENTION

This invention pertains to stress-crack resistant polyarylates and more particularly to bisphenol A iso/terephthalates modified with 4,4'-biphenol.

Polyarylates or polyesters derived from bisphenol A and iso/terephthalic acids are tough materials having a continuous use temperature of about 140° C. However, as with many other amorphous thermoplastics, they possess poor solvent and stress-crack resistance. Such polyesters may be represented as having repeating units as shown below:

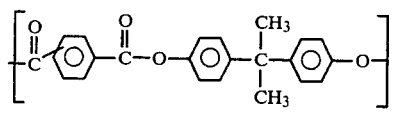

On the other hand, H. G. Weyland et al. reported in Euro. Poly J. 6, 1339 (1970) that a 4,4'-biphenol iso/terephthalate prepared by interfacial polymerization was both insoluble and infusible.

Isophthalates of 4,4'-biphenol modified with hydroquinone are described in U.S. Pat. Nos. 3,036,991 and 3,160,602. These copolymers contain at least 40 mol percent of hydroquinone isophthalate and were prepared via the reaction of the di-functional phenols with isophthaloyl chloride in solvents boiling above 300° C. These polyesters are highly crystalline having melting points ranging from 350° to 400° C. Slowly cooled moldings are crystalline and translucent while rapidly cooled or quenched moldings are amorphous and transparent. No mechanical data are revealed in these references.

Linear co-polyesters have been prepared from terephthalic or isophthalic acid, a bisphenol and hydroquinone containing 5 to 35 mol percent of the hydroquinone.

Bisphenol A polyesters of isophthalic acid, terephthalic acid or iso/terephthalic acid mixtures lack solvent and stress-crack resistance.

4,4'-Biphenol polyesters of iso/terephthalic acid mixtures are solvent resistant but are not melt processable.

U.S. Pat. No. 3,939,117 discloses a method for producing a polyarylene ester at temperatures of 0° to 100° C. in an organic solvent for the polyarylene ester in the presence of solid Ca(OH)$_2$ and a polymerization catalyst. One or more divalent phenols and aromatic dicarboxylic chlorides are used but there is no appreciation of the use of a particular ratio of particular divalent phenols to afford polyarylates having enhanced solvent and stress crack resistance.

SUMMARY OF THE INVENTION

It has now been unexpectedly found that polyarylate compositions that contain isophthalic acid moieties or a mixture of isophthalic and terephthalic acid moieties, and about 20 to about 80 mol percent of 4,4'-biphenol moieties and about 80 to about 20 mol percent of bisphenol A moieties based on total diphenol content of the polymer are solvent resistant, stress crack resistant and melt processable. The diacids and dihydric phenols are in essentially stoichiometric quantities.

The preferred polyarylate compositions consist of a dicarboxylic acid structure consisting essentially of isophthalic/terephthalic acid mol ratios of about 50/50 to about 100/0 together with a dihydric phenol mixture consisting essentially of 4,4'-biphenol/bisphenol A mol ratios of about 20/80 to about 80/20. The more preferred compositions consist of an isophthalic/terephthalic acid mol ratio of about 50/50 to about 75/25 and a dihydric phenol mixture consisting essentially of a 4,4'-biphenol/bisphenol A mol ratio of about 30/70 to about 55/45.

The resultant copolyarylates have both enhanced solvent resistance and stress crack resistance and they possess excellent thermal properties, processability, toughness and flammability characteristics. This combination of properties was unexpected in view of the properties of the polyarylates prepared from either bisphenol A or 4,4'-biphenol alone.

The polyarylates can be prepared by any of the polyester forming reactions known to those skilled in the art. Either of two additive sequences of reactants can be used. In the first procedure, diacid and the diphenol reactants are charged and polymerized simultaneously (hereinafter referred to as simultaneous addition). In the second procedure one of the diphenol reactants is charged with the acid reactants, polymerization is initiated and then the other diphenol reactant is added and the reaction is allowed to progress (hereinafter referred to as sequential addition).

The normally solid polyarylates have the following repeating units

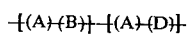

wherein A is a mixture of

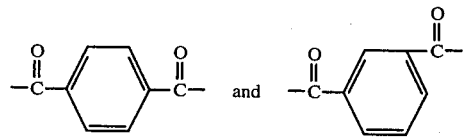

in a mol ratio containing up to about 100 mol percent of the latter;

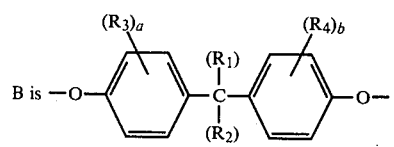

wherein each of R$_1$ and R$_2$ are each H or alkyl groups having 1 to about 7 carbon atoms, R$_3$ and R$_4$ are alkyl groups having 1 to about 18 carbon atoms, and a and b are integers having values of 0 to 4.

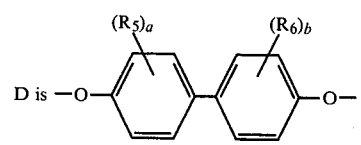

wherein R$_5$ and R$_6$ are alkyl groups having 1 to about 18 carbon atoms, and a and b are integers having values of 0 to 4, and wherein the mol ratio of —A—B— to —A—D— is in the range of about 20 to about 80, to about 80 to about 20, and the mol ratio of A to B and D is approximately stoichiometric.

Exemplary bis(4-hydroxyphenyl) alkanes include:
2,2-bis-(4-hydroxyphenyl)propane,
bis-(4-hydroxyphenyl)methane,
1,1-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane, and
2,2-bis-(4-hydroxyphenyl)heptane.

Any known polyester forming reactions can be used to make the polyarylates, such as:

(1) The reaction of the acid chlorides of isophthalic and terephthalic acids with the diphenols.

(2) The reaction of the aromatic diacids with diester derivatives of the diphenols

where R=$C_1$ to $C_{20}$ aliphatic skeletons, hereinafter referred to as the Diacetate Process.

(3) The reaction of the diaryl esters of the aromatic diacids

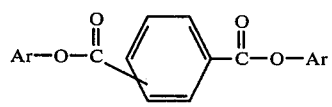

where Ar can be a phenyl, o-tolyl, m-tolyl, p-tolyl, or like residues, with the diphenols, hereinafter referred to as the Diphenate Process.

Two procedures can be used for the preparation of the polyarylates via the acid chloride route. One is carried out at low temperature and the other at high temperature. In the low temperature technique polycondensation of the acid chlorides derived from terephthalic and isophthalic acid with the dihydric phenols is effected at ambient temperatures in an inert solvent, such as methylene chloride, in the presence of a basic catalyst and an acid acceptor. A second immiscible solvent, e.g., water, may be present. In the high temperature technique, polycondensation of acid chlorides with the dihydric phenols is effected in a high boiling solvent, such as, 1,2,4-trichlorobenzene, at temperatures above about 150° C. and preferably at about 200° to about 220° C.

Other suitable inert organic solvents useful for low temperature polycondensation include halogenated aliphatic compounds, such as, chloroform, methylene bromide, 1,1,2-trichloroethane as well as methylene chloride mentioned above and the like; and cyclic ethers such as tetrahydrofuran, dioxane, and the like. For the high temperature polycondensation, suitable solvents include halogenated aromatic compounds such as, o-dichlorobenzene, 1,2,4-trichlorobenzene, diphenyl ether, diphenyl sulfone, benzoic acid alkyl esters wherein the alkyl group contains 1 to about 12 carbon atoms, phenolic ethers, such as, anisole and the like.

Preferred acid acceptors for use in the low temperature polycondensation are alkali metal and alkaline earth hydroxides including sodium, potassium, barium, calcium, strontium, magnesium, and beryllium hydroxide.

Useful basic catalysts for use in the low temperature polycondensation include tertiary amines such as alkyl amines, including trimethylamine, triethylamine, tripropylamine, tributylamine, and the like; where the alkyl group contains from 1 to about 10 carbon atoms; alkaryl amines such as, N,N-dimethylaniline, N,N-diethylaniline, N,N-dimethylnaphthylamine, benzyl dimethylamine, alpha-methylbenzyl dimethylamine, pyridine, cyclic diazo compounds, such as, diazobicyclooctane (DABCO), diazo bicyclononene (DBN) and diazobicycloundecene (DBU) and the like.

Polymerizations using the Diacetate Process can be carried out in the melt at between 260° C. and 340° C., preferably between 275° C. and 320° C. They can also be carried out either as a solution reaction at those temperatures or a suspension reaction also at those temperatures. The solvent(s) or suspending agent(s) can be one of any number of organic compounds boiling between 140° C. and 340° C. They can be chosen from hydrocarbons, ketones, ethers, or sulfones which are inert under the reaction conditions. These polymerizations may or may not be run in the presence of a catalyst. Typical solvents are tetramethylene sulfone, diphenyl ether, substituted diphenyl ether, and the like. Typical catalysts include Na, Li, K salts (organic and inorganic), transition metal salts, alkaline earth metal salts, e.g., Mg acetate, and the like. They may be performed at atmospheric pressure, supra atmospheric pressure, or under vacuum.

Polymerizations using the Diphenate Process can be carried out in the melt at between 285° C. and 350° C. The preferred temperature range is about 300° C. to 340° C. In general reduced pressure for the final portions of the reaction is used. They can also be carried out either as a solution reaction or suspension reaction under those conditions. The solvent(s) or suspending agent(s) are the same as those described above. Typical catalyst include tin compounds and generally those mentioned above for the diacetate process. Particularly preferred catalysts are Ti and tin salts, Mg acetate, and alkali metal salts, alkoxides and phenoxides.

If desired a chain stopper can be used to control the molecular weight of the polyarylates obtained. Suitable agents include monohydric phenols or their derivatives, such as, p-phenylphenol, and the like and monofunctional carboxylic acid or their derivatives, such as benzoic or naphthoic acids, and the like.

Mechanical properties of the subject polyarylates were determined as a function of monomer content and mode of addition. As shown in Tables I and II, excellent toughness, measured by pendulum impact values of $\geq =130$ ft./lbs./in$^3$, was achieved for compositions containing less than 50 mol percent of 4,4'-biphenol and less than 50 mol percent of terephthalic acid. Polyarylates obtained via the acid chloride route using either the simultaneous or sequential addition methods gave approximately the same values.

Examples of the thermal properties of 4,4-biphenol modified polyarylates are delineated in Table III. These data show that the high second order glass transition temperatures (Tg) are characteristic of the materials of this invention. In the acid chloride route the mode of addition of reactants (simultaneous vs. sequential) appears to have a slight effect on the Tg. However, a significant difference in the flow temperatures was noted under the same experimental conditions. In all cases, the temperature at which the sequentially prepared materials flow is significantly higher (greater than 340° C. as opposed to 290° C. to 310° C.).

The 4,4'-biphenol modified polyarylates showed improvement in stress crack resistance when the amount of 4,4'-biphenol was equal to or greater than 20 mol percent based on the total diphenol content. These data are presented in Table IV. Table IV also demonstrates the superior stress crack resistance of a copolymer derived from a 60/40 mol percent mixture of bisphenol A and 4,4'-biphenol and a 75/25 mol percent mixture of isophthalic acid and terephthalic acid over a polyarylate derived from bisphenol A alone and a 75/25 mol percent mixture of isophthalic acid and terephthalic acid. Compositions containing >20% biphenol are preferred. Those >30 and <55 are particularly preferred. The preferred isophthalic/terephthalic acid ratio is 50:50 to 100:0 while the most preferred is 50:50 to 75:25.

Polyarylates modified with 4,4'-biphenol also display excellent flammability characteristics. This was demonstrated with a 60/40 mol ratio bisphenol A, 4,4'-biphenol copolymer (isophthalic acid/terephthalic acid mol ratio of 75/25) prepared by the simultaneous addition route and evaluated by the Underwriters Laboratory's Bulletin 94, Test Procedure (UL-94). The test results obtained with films ranging in thickness from 47 to 53 mils showed superior flammability characteristics as delineated in Table V.

The polyarylates have a reduced viscosity (RV) of from about 0.5 to greater than 1.0, preferably from about 0.6 to about 0.8 dl/g, as measured in p-chlorophenol or other suitable solvent at a concentration of 0.2 g/dl at 25° C.

The polyarylates can be used alone or in admixture with inorganic fillers such as silica, calcium carbonate, glass fibers, organic fibers, carbon fibers and others known to those skilled in the art. Moreover they are useful as constituents in polyblends (for instance with poly(ethylene) terephthalate, polycarbonates, (meth)acrylates, polystyrene, polymeric fluorinated hydrocarbons, elastomers, rubbers, polyurethanes, and the like.)

The invention is further described in the Examples which follow.

All parts and percentages are by weight unless otherwise specified.

EXAMPLE 1

Preparation of Copolyarylates by the Simultaneous Addition Procedure via the Acid Chloride Route A two-liter resin kettle equipped with a paddle stirrer, reflux condenser leading to a caustic scrubber, thermometer and nitrogen inlet tube was charged with:

| Ingredients | Amounts |
| --- | --- |
| Bisphenol A | 68.49 g. (0.300 mol) |
| 4,4'-Biphenol | 37.24 g. (0.200 mol) |
| Isophthaloyl Chloride | 76.13 g. (0.375 mol) |
| Terephthaloyl Chloride | 25.38 g. (0.125 mol) |
| p-Phenylphenol | 1.55 g. (0.009 mol) |
| 1,2,4-Trichlorobenzene | 1200 ml. |

The reaction mixture was sparged with nitrogen for 20 minutes and then immersed in a hot oil bath at about 170° C. It was heated at reflux (215° C.) for 20 hours. The hot hazy yellow polymer solution was filtered through a medium frit sintered glass funnel and then poured into 3500 ml. of toluene. On cooling this solution became cloudy. After 3 to 4 hours at room temperature, the obtained suspension of fine polymer particles in toluene/trichlorobenzene was coagulated in methanol using a Waring Blender (500 ml of suspension/3000 ml methanol). The coagulated polymer was washed three times in 3000 ml of methanol (2 minutes of stirring in the Waring Blender) and air dried for 3 hours. Further drying for 1 day at 120° C. (under a vacuum of 20–30 mm) and 2 days at 120° C. (under 0.5 mm vacuum) yielded melt stable material.

EXAMPLE 2

Preparation of Polyarylates Using the Sequential Addition Procedure via the Acid Chloride Process A 1000 ml four-necked round bottom flask equipped with a paddle stirrer, reflux condenser leading to a caustic scrubber, thermometer, and $N_2$ inlet was charged with:

| Biphenol A | 18.24 gm (0.080 mol) |
| --- | --- |
| Isophthaloyl Chloride | 15.23 gm (0.075 mol) |
| Terephthaloyl Chloride | 5.08 gm (0.025 mol) |
| 1,2,4-Trichlorobenzene | 200 ml |

The reaction mixture was sparged with $N_2$ for 20 minutes and then immersed in a hot ($\geqq 170°$ C.) oil bath. It was heated at reflux (215° C.) for six to eight hours (till no HCl was being evolved). The oil bath was removed and the following was added:

| 4,4'-Biphenol | 3.72 gm (0.020 mol) |
| --- | --- |
| p-Phenylphenol | .225 gm (0.0015 mol) |
| 1,2,4-Trichlorobenzene | 65 ml |

The flask was reimmersed in the hot oil bath and heated at reflux for an additional 16 hours. The hot yellow polymer solution was filtered through a medium frit sintered glass filter, poured into 1500 ml toluene and then worked up as described in Example 1 to yield a melt stable material $RV=0.72$, $MF_{10\,min}=17.8$ dg/min. and $MF_{30\,min.}=23.5$ dg./min. The RV value (reduced viscosity) was obtained with solution of 0.2 g. of polyarylate in 100 ml. of P-chlorophenol at 49° C. The MF (melt flow) values were obtained at 355° C. and a 440 psi load as specified in ASTM D-1238.

EXAMPLE 3

Preparation of Copolyarylates using Calcium Hydroxide as the Acid Acceptor

In a 500 ml four-necked round bottom flask equipped with a paddle stirrer, thermometer, a claisen adapter with a dropping funnel (200 ml) and a reflux condenser, and a nitrogen inlet is charged with:

| Bisphenol A | 11.42 gm (0.05 mol) |
|---|---|
| 4,4'-Biphenol | 9.30 gm (0.05 mol) |
| Calcium Hydroxide | 17.81 gm (0.24 mol) |
| Chloroform | 200 ml |

The reaction mixture is sparged with nitrogen for 20 minutes and then triethylamine (70 μl, 1 mol percent) is added; then a solution of:

| Isophthaloyl chloride | 15.23 gm (0.075) |
|---|---|
| Terephthaloyl chloride | 5.08 gm (0.025) |
| Chloroform | 50 ml | is added over 12 minutes. The reaction temperature rises to 55° C., at which time the mixture is cooled in a water bath (30° C.). Temperature is stabilized at 32° C. after 10 minutes. Reaction mixture becomes thicker rapidly and the color slowly changes from blue to tan. The reaction mixture is stirred at room temperature for 4 hours, at which time terminator is added (p-phenyl phenol, 0.250 gm, 0.0015 mol) and stirring continued for an additional hour. The reaction mixture is diluted with 750 ml of chloroform and filtered through a celite cake. The pale yellow solution is washed with acid (1000 ml 0.5 percent HCl) under high shear for 20 minutes and then 4 times with water (till neutrality), also under high shear. Solvent was removed to approximately half volume and the polymer is coagulated in 3000 ml methanol, and is worked up as described in Example 1.

EXAMPLE 4

Preparation of Copolyarylates via the Diacetate Route

A stirred 1 gallon stainless steel reactor (oil heated) fitted with a packed column and distillation head, nitrogen inlet tube and hydraulically driven agitator is charged with:

| 2,2-(4,4'-Diacetoxyphenyl) propane | 840.0 gm (2.69 mol) |
|---|---|
| 4,4'-Diacetoxybiphenyl | 311.54 gm (1.15 mol) |
| Isophthalic acid | 319.1 gm (1.92 mol) |
| Terephthalic acid | 319.1 gm (1.92 mol) |
| Acetic Anhydride | 19.6 gm (.192 mol) |
| Magnesium acetate | 0.14 gm (.000192 mol) |
| Diphenyl ether | 740 gm |

The reaction mixture is sparged with nitrogen for 30 minutes and then the oil heater is turned on. The reaction is heated to 275° C. over the period of 1 hour and then the reaction is allowed to proceed at 275°–285° C. Acetic acid begins to distill off when the reaction mixture reaches 260° C. The acetic acid is collected and the reaction system is maintained such that the diphenyl ether is refluxing in the column. After 4 to 5 hours the desired molecular weight is achieved, as evidenced by the power draw on the agitator.

EXAMPLE 5

Preparation of Polyarylates by a One Pot Diacetate Route

In the same equipment described in Example 4 is charged:

| Bisphenol A | 613.3 gm (2.69 mol) |
|---|---|
| 4,4'-Biphenol | 213.9 gm (1.15 mol) |
| Acetic Anhydride | 852.8 gm (8.45 mol) |
| Isophthalic acid | 319.1 gm (1.92 mol) |
| Terephthalic acid | 319.1 gm (1.92 mol) |
| Magnesium acetate | 0.14 gm (.192 mol) |
| Diphenyl ether | 740 gm |

The reaction mixture is sparged with nitrogen for 20 minutes and then the reaction mixture is heated to 170° C. The reaction is held at 170° C. for 1.5 hours and then the reaction mixture is heated to 275° C. The reaction then proceeds as described in Example 4.

EXAMPLE 6

Preparation of Polyarylates via the Diphenate Process

In the same equipment described in Example 4 is charged:

| Bisphenol A | 232.6 gm (1.02 mol) |
|---|---|
| 4,4'-Biphenol | 186.0 gm (1.00 mol) |
| Diphenyl isophthalate | 318.0 gm (1.00 mol) |
| Diphenyl terephthalate | 318.0 gm (1.00 mol) |
| Magnesium (II) acetate | .360 gm (100 ppm) |
| Diphenyl Ether | 214 gm |

The reaction is sparged with nitrogen for 40 minutes and then the reaction mixture is heated to 280° C. for 2 hours. The temperature is increased to 300° C. for 30 minutes and then a vacuum of 100 mm Hg is applied. The temperature of the reaction is increased to 345° C. over a 2 hour period and simultaneously the vacuum is further reduced to approximately 1.0 mm Hg. The reaction vessel is then brought to atmospheric pressure under nitrogen and then discharged.

TABLE 1

MECHANICAL PROPERTIES OF 4,4'-BIPHENOL MODIFIED POLYARYLATES AT ISO/TEREPHTHALATE MOL RATIO OF 75/25[5]

| Bisphenol A/Biphenol Mol Ratio | 100/0 | 80/20 | 80/20 | 60/40 | 60/40 | 50/50 | 40/60 | 30/70 |
|---|---|---|---|---|---|---|---|---|
| Mode of Addition[1] | A | A | B | A | B | A | A | A |
| Tensile Modulus[2] (psi) | 189,000 | 202,000 | 208,000 | 197,000 | 212,000 | 201,000 | — | 206,000 |
| Tensile Strength[2] | 8,000 | 7,710 | 8,430 | 7,850 | 7,530 | 7,850 | — | — |
| Elongation at Break[2] (percent) | 18 | 14 | 14 | 25 | 10 | 17 | — | 3 |
| Pendulum Impact (ft-lb/in.$^3$)[3a] | 156 | 154 | 168 | 242 | 182 | 161 | Brittle | 4[3b] |
| RV[4] | 0.74 | 0.75 | 0.75 | 0.74 | 0.75 | 0.74 | 0.78 | Insoluble |

[1]A = all reagents added simultaneously, B = reagents added using sequential addition method.
[2]Measured by method described in ASTM D-638
[3a]Samples were considered tough when Pendulum Impact was ≧ 130 ft-lb/in.$^3$
[3b]Very brittle
[4]At 49° C., in p-chlorophenol, 0.2 gm/100 ml.
[5]Compression molded samples.

TABLE II

MECHANICAL PROPERTIES OF 4,4'-BIPHENOL MODIFIED POLYARYLATES: EFFECT OF ACID COMPOSITION

| Iso/Terephthalate Mol Ratio | 50/50 | 50/50 | 100/0 | 100/0 | 100/0 | 100/0 |
|---|---|---|---|---|---|---|
| Bisphenol A/Biphenol Mol Ratio | 70/30 | 50/50 | 70/30 | 70/30 | 60/40 | 50/50 |
| Mode of Addition[1] | A | A | A | B | A | A |
| Tensile Modulus[2] (psi) | 200,000 | 201,000 | 181,000 | 212,000 | 193,000 | 216,000 |
| Tensile Strength[2] (psi) | 7,870 | 7,850 | 7,260 | 8,110 | 7,470 | 7,950 |
| Elongation at Break[2] (percent) | 10.5 | 11 | 26 | 8 | 18 | 13 |
| Pendulum Impact[3a] (ft-lbs/in.[3]) | 133 | 15[3b] | 151 | 185 | 160 | 105 |
| Reduced Viscosity[4] | 0.72 | 0.74 | 0.76 | 0.78 | 0.70 | 0.68 |

[1] A = all reagents added simultaneously; B = reagents added using sequential addition method.
[2] Measured by method of ASTM D-638.
[3a] Samples were considered tough when Pendulum Impact was ≧130 ft-lb/in.[3] using ASTM D-216.
[3b] Very brittle
[4] AT 49° C., in p-chlorophenol, 0.2 gm/100 ml.

TABLE III

THERMAL PROPERTIES OF 4,4'-BIPHENOL MODIFIED POLYARYLATES

| Iso/Terephthalate Mol Ratio | 75/25 | 75/25 | 75/25 | 75/25 | 75/25 | 50/50 | 50/50 | 100/0 | 100/0 | 100/0 | 100/0 |
|---|---|---|---|---|---|---|---|---|---|---|---|
| Bisphenol A/Biphenol Mol Ratio | 100/0 | 80/20 | 80/20 | 60/40 | 60/40 | 70/30 | 50/50 | 70/30 | 70/30 | 60/40 | 50/50 |
| Mode of Addition [1] | A | A | B | A | B | A | A | A | B | A | A |
| $T_g^2$ (C.°) | 185 | 185 | 185 | 190 | 195 | 190 | 185 | 185 | 190 | 190 | 190 |
| HDT[3] (C.°) | 170 | 170 | 170 | 175 | 180 | 175 | 170 | 170 | 175 | 175 | 175 |
| Flow[4] (C.°) | — | 300 | 340 | 300 | 380 | 300 | — | 290 | 370 | 290 | 300 |

[1] Cf footnote 1, Table 1.
[2] cf. "Second Order Transition Temperature and Fibre Properties" by A. Brown, Textile Research Journal 25, 891 (1955).
[3] ASTM D-648-56.
[4] ASTM D-1238.

TABLE IV

ENVIRONMENTAL STRESS RUPTURE RESULTS: 4,4'-BIPHENOL MODIFIED POLYARYLATES[a]

| Bisphenol A/Bisphenol Mol Ratio (RV) | | 80/20 (0.74) | 80/20 (0.74) | 60/40 (0.75) | 100/0 (0.77) |
|---|---|---|---|---|---|
| Preparative Method[b] | | A | B | A | A |
| Environment | Stress | | Time to Rupture | | |
| Acetone | 200 | 10 minutes C&B | 10 minutes NCNB | — | 3 seconds Rupture |
| | 1000 | — | 10 seconds Rupture | 10 minutes NCNB | — |
| Toluene | 200 | 10 seconds Rupture | 33 seconds Rupture | 15 minutes C&B | 4 seconds Rupture |
| | 1000 | — | 2 seconds Rupture | 20 seconds Rupture | — |
| Trichloro-ethylene | 200 | — | — | 10 seconds Rupture | 41 seconds Rupture |
| | 1000 | — | — | 3 seconds Rupture | — |
| Xylene | 200 | — | — | 1 hour NCNB | 3 seconds Rupture |
| | 1000 | — | — | — | — |
| Carbon Tetrachloride | 1000 | 10 minutes C&B | — | 20 minutes NCNB | 10 seconds Rupture |
| | 2000 | — | 30 minutes NCNB | — | — |
| | 4000 | — | 15 seconds Rupture | — | — |

C&B = crazed and brittle; NCNB = not crazed, not brittle
[a] Iso/terephthalate Mol Ratio For All Samples 75/25.
[b] As in Table II, Footnote (1).

TABLE V

BISPHENOL A/BIPHENOL 60/40 POLYARYLATES RV = 0.74 (ISO/TEREPHTHALATE RATIO 75/25)

| Sample No. | Thickness (mils) | 1st Ignition | 2nd Ignition | Additional 30 Second Ignition |
|---|---|---|---|---|
| 1 | 47 | Out Instantly | Out 2 Seconds | Out 1 Second |
| 2 | 47 | Out Instantly | Out 1 Second | Out Instantly |
| 3 | 53 | Out 1 Second | Out 1 Second | Out Instantly |
| 4 | 48 | Out 2 Seconds | Out 1 Second | Out Instantly |
| 5 | 48 | Out 2 Seconds | Out Instantly | Out Instantly |
| 6 | 48 | Out 1 Second | Out 2 Seconds | Out Instantly |

Although the invention has been described in its preferred form with a certain degree of particularity, it is understood that the present disclosure has been made only by way of example and that numerous changes can be made without departing from the spirit and scope of the invention.

What is claimed is:

1. A normally solid polyarylate having the following repeating units:

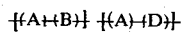

wherein A is a mixture of terephthalic and isophthalic acid residues, viz.,

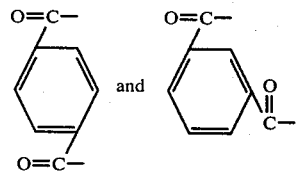

in a mol ratio containing up to about 100 mol percent of the latter to a 50/50 mol ratio B is

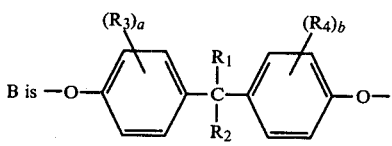

wherein each of $R_1$ and $R_2$ are each H or alkyl groups having 1 to about 7 carbon atoms, $R_3$ and $R_4$ are alkyl groups having 1 to about 18 carbon atoms and a and b are integers having values of 0 to 4;

D is

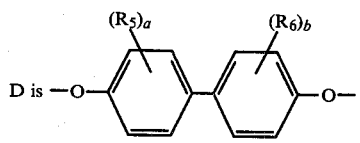

wherein $R_5$ and $R_6$ are alkyl groups having 1 to about 18 carbons and a and b are integers having values of 0 to 4, and wherein the mol ratio of B to D is in the range of from about 20 mols of B to 80 mols of D to about 80 mols of B to about 20 mols of D and the mol ratio of A to B and D is approximately stoichiometric.

2. Polyarylate claimed in claim 1 where B is a radical residuum of 2,2-bis(4-hydroxyphenyl) propane with both hydroxyl H atoms removed and D is the radical residuum of 4,4'-biphenol with both hydroxyl H atoms removed.

3. Polyarylate claimed in claim 1 wherein the mol ratio of the acid residues in A is about 50/50.

4. Polyarylate claimed in claim 1 wherein A is an isophthalic acid residue only.

5. Polyarylate claimed in claim 1 wherein the mol ratio of B to D is from 70/30 to about 45/55.

6. Polyarylate claimed in claim 1 wherein the mol ratio of isophthalic acid to terephthalic acid is from about 50/50 to about 75/25.

7. Polyarylate claimed in claim 1 wherein $R_1$, $R_2$, $R_3$, and $R_4$ are each methyl.

8. Polyarylate claimed in claim 1 wherein $R_5$ and $R_6$ are each methyl and a and b are each 1.

9. Polyarylate claimed in claim 1 wherein $R_1$ and $R_2$ are H.

10. Polyarylate claimed in claim 1 wherein $R_1$ is methyl and $R_2$ is butyl.

* * * * *